United States Patent [19]

Bishop, Jr. et al.

[11] Patent Number: 6,078,577

[45] Date of Patent: *Jun. 20, 2000

[54] SYSTEM AND METHOD FOR PACKET DATA COMMUNICATION

[75] Inventors: James William Bishop, Jr., Chandler; Keith Andrew Olds, Mesa; Peter Joseph Armbruster, Tempe; Aswath Rao, Chandler, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/752,985

[22] Filed: Nov. 21, 1996

[51] Int. Cl.$^7$ ..................................................... H04B 7/212
[52] U.S. Cl. ............................................ 370/348; 370/443
[58] Field of Search .................................... 370/229, 230, 370/231, 232, 233, 234, 235, 316, 321, 329, 439, 458, 462, 348, 349, 473, 449, 347, 443

[56] References Cited

U.S. PATENT DOCUMENTS

| 5,179,556 | 1/1993 | Turner ..................................... 370/233 |
| 5,448,559 | 9/1995 | Hayter ..................................... 370/398 |
| 5,463,620 | 10/1995 | Sriram ..................................... 370/412 |
| 5,594,738 | 1/1997 | Crisler et al. ........................... 370/347 |
| 5,636,212 | 6/1997 | Ikeda ..................................... 370/233 |

FOREIGN PATENT DOCUMENTS

| 2270815 | 3/1994 | United Kingdom . |
| 2278976 | 12/1994 | United Kingdom . |
| 9217957 | 10/1992 | WIPO . |

*Primary Examiner*—Chau Nguyen
*Assistant Examiner*—Soon-Dong Hyun
*Attorney, Agent, or Firm*—Harold C. McGurk; Dana B. LeMoine; Timothy J. Lorenz

[57] ABSTRACT

A packet data communication system (10) where multiple users (87) can access the same channel (22) to maximize an efficiency of the communication system (10). Each channel (22) is divided into time slots. Each time slot is allocated to a user based on the user's request (303) for time slots and the availability of time slots. If time slots are available, then the system (10) will inform the user (87) and allocate the time slot to the user (87, 305). If there are no available time slots, then the system (10) will inform the user (87) that no time slots are available and access to the system's channel is denied. The user (87) will continue to request access (303) to the system (10) as long as the user has data packets to send.

10 Claims, 4 Drawing Sheets

SYSTEM AND METHOD FOR PACKET DATA COMMUNICATION

FIELD OF THE INVENTION

This invention relates generally to systems and methods for communication and, in particular, to systems and methods for packet data communication.

BACKGROUND OF THE INVENTION

Conventional digital cellular radio telecommunications systems which incorporate satellite switching centers orbiting the earth utilize packetized data communication for communication between subscriber units and the satellite switching centers. The link between subscriber units and the satellite is a radio frequency ("RF") link which is typically a microwave L-band resource. In conventional arrangements, a channel resource of the communication link is designated or assigned to a subscriber unit for communications. The channel resource is retained until the subscriber unit releases it (or the satellite switching center loses communication with the subscriber unit). Then, at the time a call is made, an L-band resource is requested, and when the L-band resource becomes available, it is reserved for the use of the subscriber unit and cannot be used by any other subscriber unit. Although the satellite system provides for packetized data communication, the number of users which may be accommodated is limited to the number of available channels.

Accordingly, there is a significant need for a satellite telecommunication system that increases the number of calls that can be made using a limited amount of available channels and bandwidth.

DETAILED DESCRIPTION OF THE PREFERRED EMBODIMENTS

The present invention has utility in that it increases the number of calls that can be serviced by more efficiently managing and servicing the calls.

Figure 1:
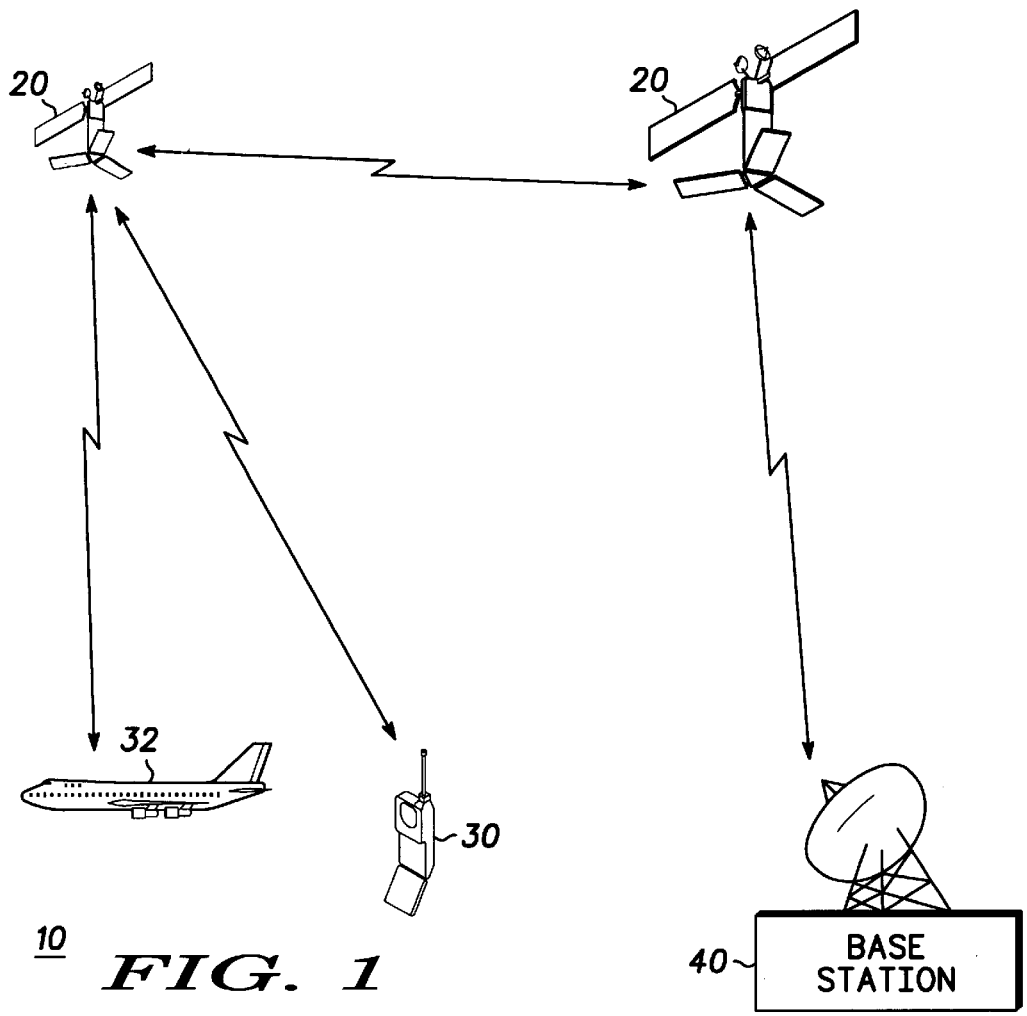
FIG. 1 shows a schematic block diagram of a communication system within which the present invention may be practiced.

FIG. 1 shows a highly simplified diagram of satellite telecommunication system 10. As shown in FIG. 1, telecommunication system 10 comprises at least one satellite 20, any number of subscriber units 30, 32 and at least one base station 40. Generally, satellites 20, subscriber units 30 and base station 40 of telecommunication system 10 may be viewed as a network of nodes. All nodes of telecommunication system 10 are or may be in data communication with other nodes of telecommunication system 10 through telecommunication links. In addition, all nodes of telecommunication system 10 are or may be in data communication with other telephonic devices dispersed throughout the world through public switched telephone networks (PSTNs) and/or conventional terrestrial communication devices coupled to a PSTN through conventional terrestrial base stations.

A "satellite" as used throughout this description means a manmade object or vehicle intended to orbit the earth. A "satellite" comprises geostationary, low-earth and medium-earth orbiting satellites and/or any combination thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial-based or space-based telecommunication systems and/or any combination thereof.

The present invention is applicable to space-based telecommunication systems 10 that assign particular regions on the earth to specific cells on the earth, and preferably to systems 10 that move cells across the surface of the earth. The present invention is applicable to space-based telecommunication systems 10 having at least one satellite 20 in low-earth, medium-earth or geosynchronous orbit. Satellite 20 may be a single satellite or one of many satellites 20 in a constellation of satellites orbiting earth. The present invention is also applicable to space-based telecommunication systems 10 having satellites 20 which orbit earth at any angle of inclination including polar, equatorial, inclined or other orbital patterns. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on the earth's surface).

Each satellite 20 communicates with other nearby satellites through cross-links 24 that form a backbone of space-based mobile telecommunication system 10. Thus, a call or communication from subscriber unit 30 located at any point on or near the surface of the earth may be routed through satellite 20 or a constellation of satellites to within range of substantially any other point on the surface of the earth. A communication may be routed down to subscriber unit 30 (which is receiving the call) on or near the surface of the earth from another satellite. How satellite 20 physically communicates (e.g., spread spectrum technology) with subscriber units 30 and base station 40 is well known to those of ordinary skill in the art.

Subscriber units 30 may be located anywhere on the surface of earth or in the atmosphere above earth, for example in an airplane 32. Mobile telecommunication system 10 may accommodate any number of subscriber units 30. Subscriber units 30 are preferably communication devices capable of receiving voice and/or data from satellites 20 and/or base stations 40. By way of example, subscriber units 30 may be handheld, mobile satellite cellular telephones adapted to transmit to and receive transmissions from satellites 20 and/or base stations 40. Moreover, subscriber units 30 may be computers capable of sending email messages, video signals or facsimile signals just to name a few.

How subscriber units 30 physically transmit voice and/or data to and receive voice and/or data from satellites 20 is well known to those of ordinary skill in the art. In the preferred embodiment of the present invention, subscriber unit 30 communicates with satellite 20 using a limited portion of the electromagnetic spectrum that is divided into numerous channels. The channels are preferably L-Band, K-Band, S-band frequency channels or combination thereof, but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Base station 40 communicates with and controls satellites 20. There may be multiple base stations 40 located at different regions on the earth. For example, there may be one base station located in Honolulu, another base station located in Los Angeles and another base station in Washington, D.C. Another example is to have separate base stations located in each country on the earth. Base stations 40 may provide satellite signalling commands to satellite 20 so that satellite 20 maintains its proper position in their orbit and perform other essential house-keeping tasks. Base stations 40 may be additionally responsible for receiving from satellite 20 and/or transmitting to satellites 20 voice and/or data. How base station 40 physically communicates (e.g., spread spectrum) with satellite 20 and/or subscriber units 30 is well known to those of ordinary skill in the art.

Satellites 20 and base station 40 can be viewed as switching centers for system 10. Each switching center receives incoming signals from any of a plurality of origins and switches the incoming signals to a plurality of destinations. In the preferred embodiments, these signals may be digital packets which carry signalling and/or communication data. Signalling data control the operation of services provided by system 10. Communication data represents user information, including but not limited to, voice, fax and data. Subscriber units 30 and base stations 40 may include vocoders (not shown) to transform analog audio signals into digital packets and vice versa. Other subscriber units may be configured to communicate video. While communication packets occasionally serve as signalling needs for system 10, a substantially continuous stream of data packets are required to support a communication path between subscriber units.

When subscriber unit 32 is an airplane or aboard an airplane, two types of communications are primarily provided via the satellite link. The types of communications may be categorized as safety communications and commercial communications. Safety communications are those that involve pilot communications or instrumentation telemetry and typically are directed back to an aircraft operation center which is connected to base station 40. The commercial communications are principally those involving passenger cellular phone communications. For safety communications, so called "circuit voice" and "circuit data" services must be provided, as must packet data.

Figure 2:
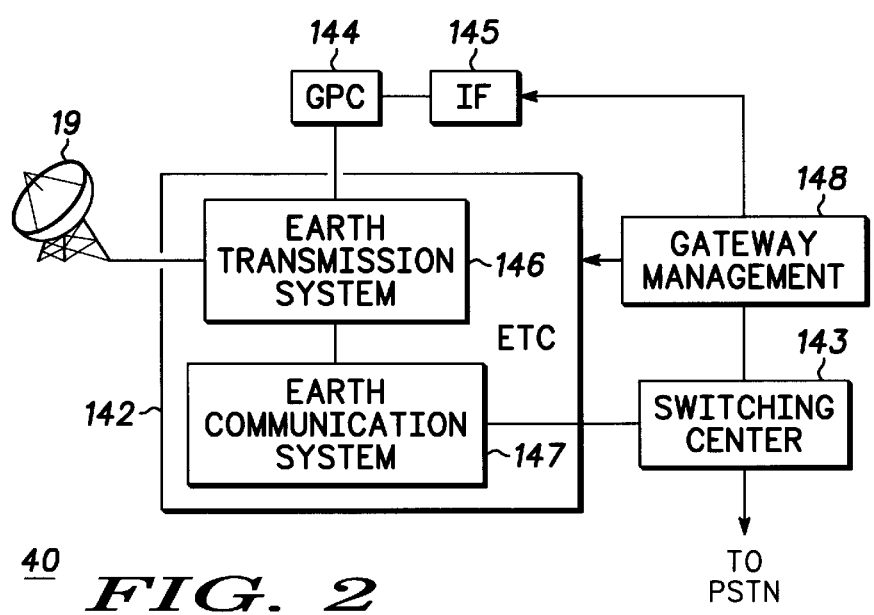
FIG. 2 shows a schematic block diagram of a base station according to a preferred embodiment of the present invention.

FIG. 2 shows a schematic block diagram of base station 40 according to a preferred embodiment of the present invention. Each base station 40 has at least one antenna 19 which provides a communication link to satellite 20. The communication link in the preferred embodiment is an RF link and, more specifically, an L-band microwave RF link. Earth terminal controller ("ETC") 142 includes earth transmission system ("ETS") 146 (which is coupled to antenna 19) and earth communication system ("ECS") 147 (which is coupled between ETS 146 and switching center 143). Base station 40 further includes gateway packet center ("GPC") 144 and interworking function ("IWF") 145 which provides control for GPC 144. Gateway management 148 includes a processing unit which centralizes control of base station 40. The gateway packet controller is a data packet switch which may be of conventional design.

One arrangement for establishing communication between base station 40 and satellites 20 and between one satellite 20 and another satellite 20 is referred to as a "circuit switch" arrangement. In conventional circuit switching, when a request is made for a resource or channel, once the resource is allocated to a user, that resource cannot be used by others until its use is relinquished by the user. Even when there is no data to send and the call is idle, others cannot use the circuit switched allocated resources.

In accordance with the principle of the invention, a multiple access arrangement is provided. Before a subscriber unit sends data packets through system 10, the subscriber unit makes a request for use of the resource (i.e., channel), indicating the number of data packets to be sent. The system controller, in turn, schedules how and when the data packets will be sent and returns a message to the requesting subscriber unit that identifies how and when the data packets will be sent (e.g., which time slots to use).

Figure 3:
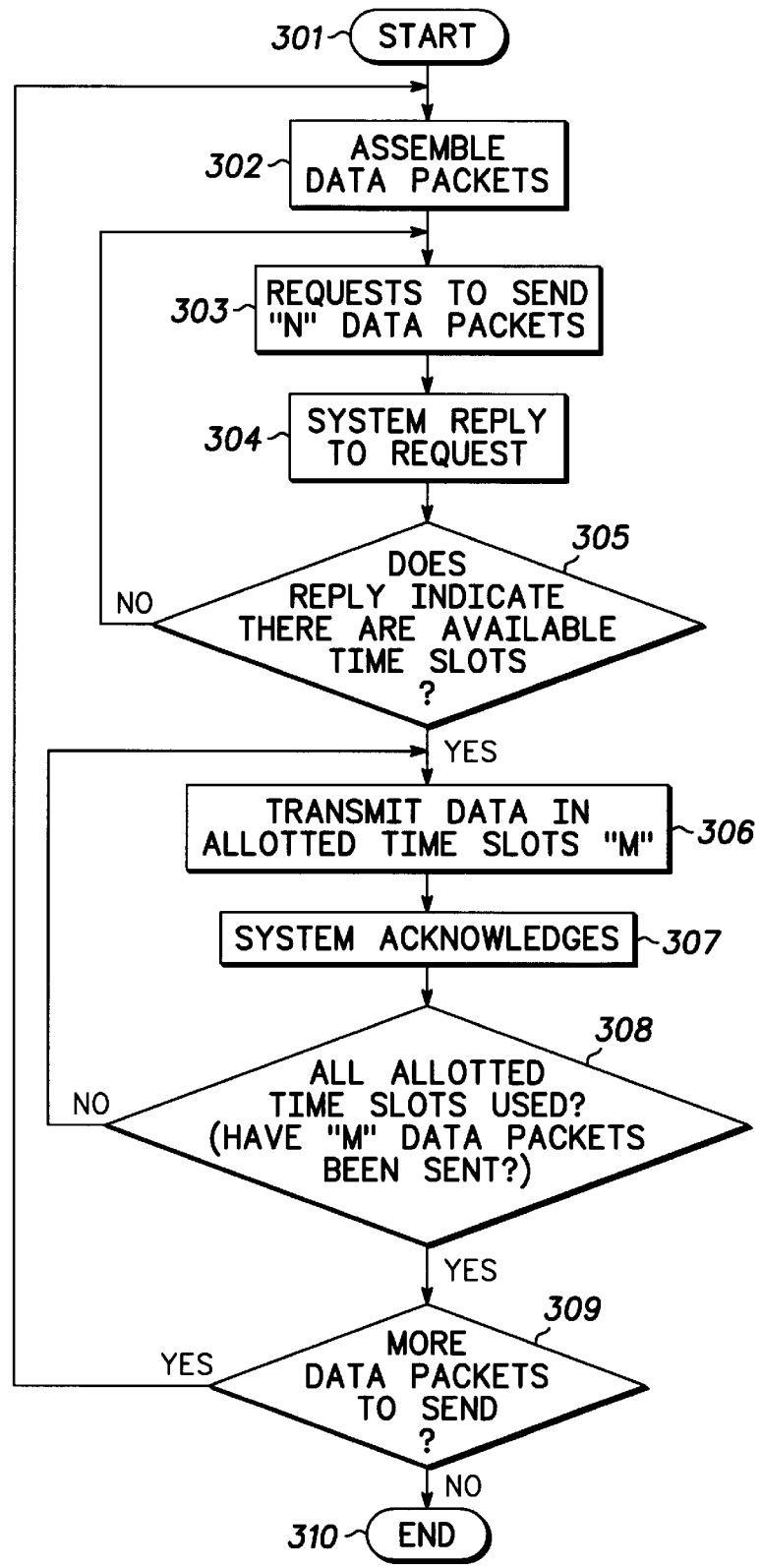
FIG. 3 shows a flow chart of a method of data transmission according to a preferred embodiment of the present invention.

FIG. 3 shows a flow chart of method 300 of data transmission according to a preferred embodiment of the present invention. Method 300 starts at step 301 when a subscriber unit (for example, subscriber unit 32 of FIG. 1) forms data packets. The subscriber unit assembles in step 302 the data packets and determines the number of data packets it wants to send to a destination subscriber unit. The subscriber unit then transmits request message 400 in step 303 to a satellite. Request message 400 requests permission to transmit a number of data packets to the satellite. This request is in a form of request message 400 shown in FIG. 4.

Figure 4:
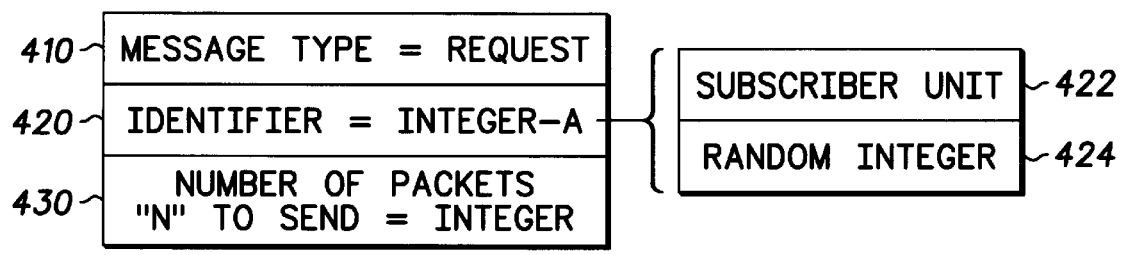
FIG. 4 shows a format of a request message according to a preferred embodiment of the present invention.

FIG. 4 shows a format of request message 400 according to a preferred embodiment of the present invention. Request message 400 comprises at least three fields: header field 410, identifier field 420, and number of packets field 430. Header portion 410 identifies whether the message is a request for access to transmit data. Identification field 420 includes information that uniquely identifies the subscriber unit making the transmit request and has two fields 422, 424. Field 422 identifies the requesting subscriber unit, using any of several possible identifiers including, but not limited to, the phone number of the requesting subscriber unit, a secret identity of the requesting subscriber unit or an encrypted version of either. Field 424 is a random integer unique to this particular request. The unique request number distinguishes one request from another request for a specific subscriber unit. Number of packets field 430 indicates the number of packets to be sent.

Returning to FIG. 3, after request message 400 is generated in step 302 and sent in step 303, satellite responds in step 304 by sending a reply message. The satellite responds with either one of two messages which are shown respectively in FIG. 5 and FIG. 6. If the satellite allows the request for access, the satellite transmits request allowed message 500 shown in FIG. 5 to the subscriber unit. If the satellites do not allow the request for access, the satellite transmits request denied message 600 shown in FIG. 6 to the subscriber unit.

Figure 5:
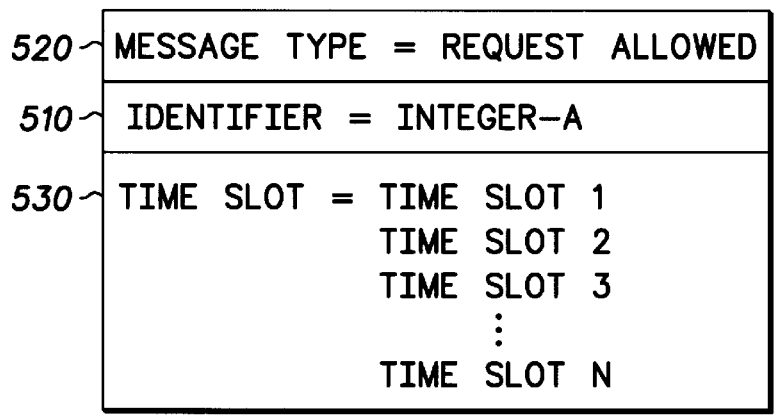
FIG. 5 shows a format of a request allowed message according to a preferred embodiment of the present invention.

FIG. 5 shows a format of request allowed message 500 according to a preferred embodiment of the present invention. Request allowed message 500 comprises at least identifier field 510, message type field 520 and time slot field or fields 530. Identifier field 510 identifies the subscriber unit and the unique request number to whom the message is sent. Message type field 520 identifies whether the request is allowed. Time slot field 530 identifies the time slots in which the data packets may be sent. It should be noted that the number of time slots may be less than the number of packets which the subscriber unit has indicated that it desires to send. In that instance, the subscriber unit will make additional requests for additional time slots until it has completed the data transfer.

Figure 6:
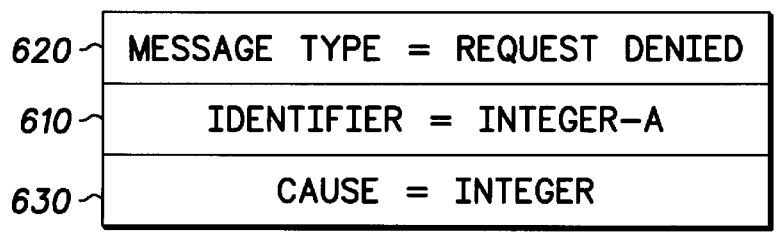
FIG. 6 shows a format of a request denied message according to a preferred embodiment of the present invention.

FIG. 6 shows request denied message 600 according to a preferred embodiment of the present invention. In certain instances, request denied message 600 sent back to the subscriber unit may deny the request for transfer of data. As shown in FIG. 6, the message format is similar to that of FIG. 5 in that request denied message 600 comprises identifier field 610, message type field 620 and cause field 630. Identifier field 610 identifies the subscriber unit to whom the message is sent. Message type field 620 indicates that the request for access is denied. Cause field 630 provides a reason for denial of the request. That cause can typically be identified as an integer with the integer corresponding to a corresponding specific reason. For example, reason number "1" may provide an indication that the system is congested, while reason "2" may indicate that the system is down.

Turning back to FIG. 3, if the request was denied in step 305, the system will then return to step 303. In the event that the request allowed message has been sent indicates that the request has been allowed in task 304 and there are available time slots in step 305, the subscriber unit transmits in step 306 the number of data packets corresponding to the number of time slots indicated (see number of packets field 530 of FIG. 5). After each data packet is sent by the subscriber unit in step 306, an acknowledgment signal is sent by the satellite in step 307.

After the subscriber unit receives the acknowledgment signal, the subscriber unit determines in step 308 whether or not all of the assigned time slots have been utilized. If they have not, the subscriber unit returns to step 306 and transmits a new data packet. If however, in step 308, the subscriber unit determines that all of the assigned time slots have been utilized, then, in step 307, the subscriber unit determines if there are more data packets to be sent. If there are more data packets to be sent, method 300 then returns to step 302 and any remaining data packets will be assembled along with new data packets and a new request is transmitted according to step 303. If there are no more data packets to be sent, method 300 ends at step 310 until more data packets have to be sent, at which time method 300 is repeated beginning at step 301.

Figure 7:
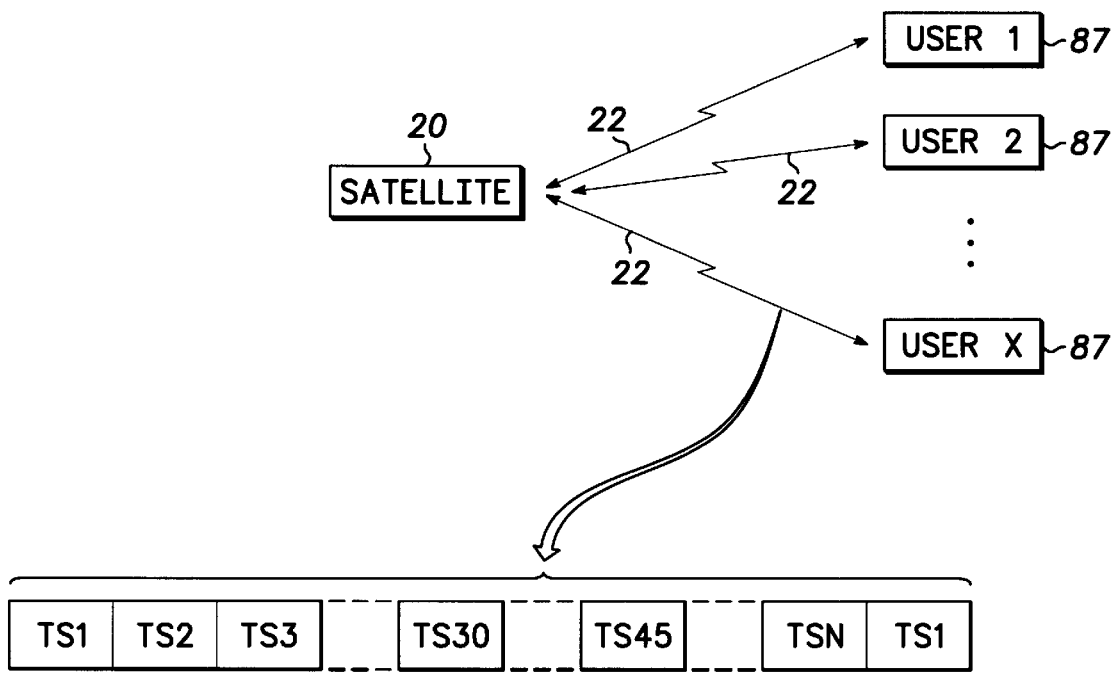
FIG. 7 illustrates in block diagram form a system in which multiple users compete for access to a satellite.

To further illustrate the principles of the invention, FIG. 7 illustrates in block diagram form a system in which multiple users compete for access to a satellite 20 over communication link 22, along with one time division multiplex frame of one channel of communication link 22 (which may comprise multiple such frames and channels). Each subscriber unit may request system service at any time. Efficient use of the channel is accomplished via the arbitration process which takes into account available resources and the number of packet transmission opportunities requested by each subscriber.

For example, subscriber unit 1 and subscriber unit 3 both seize a channel of the communication link. Each channel is time division multiplexed into N time slots. Subscriber unit 1 initially assembles four data packets and requests access. Subscriber unit 3 initially assembles two data packets and likewise requests access. Although not shown, other users are simultaneously accessing the channels of the communication link. In response to the requests from subscriber unit 1 and subscriber unit 3, subscriber unit 1 is assigned time slots 1 and 30 and subscriber unit 3 is assigned time slots 2 and 45. In the next time frame, subscriber unit 1 will transmit one data packet in time slot 1 and a second data packet in time slot 30. Subscriber unit 3 transmits its two data packets in time slots 2 and 45. Since subscriber unit 1 has not transmitted all of its assembled data packets, it sends a second request and, for example, may be assigned to utilize time slots 30 and 45 in the next frame.

What is claimed is:

1. A method of operating a data packet communication system, the method comprising the steps of:

transmitting requests where each of the requests identifies the number of data packets that are to be transmitted through the data packet communication system, and where each of the requests includes a unique request number comprising a random integer;

allocating specific time slots of at least one frame of a channel for the transmission of at least one of the data packets;

transmitting the at least one of the data packets through the data packet communication system, wherein each of the at least one of the data packets is transmitted in a corresponding one of the specific time slots allocated in the allocating step; and repeating each of the steps until all of the data packets have been sent.

2. A method as recited in claim 1, further comprising the step of assembling data packets.

3. A method as recited in claim 1, further comprising the step of waiting for a reply to the request.

4. A method as recited in claim 3, wherein the allocating step includes the step of determining whether the reply indicates that there are time slots of the channels available for servicing the requests.

5. A method as recited in claim 4, further comprising the step of repeating the request and determination steps until the time slots become available.

6. A method of operating a communication system for providing communication between users, comprising the steps of:

transmitting by a first user of the users a first message requesting access to a channel, the first message identifying a first number of first data packets to be transmitted over the channel, the first message including a unique request number comprising a random integer;

providing a reply message to the first user, the reply message indicating that specific time slots of at least one frame equal in number to a second number are available to the first user for transmitting the second number of the first data packets, the second number being equal to or less than the first number; and transmitting the second number of the first data packets in the specific time slots.

7. A method as recited in claim 6, wherein the second number is less than the first number.

8. A method as recited in claim 7, further comprising the step of transmitting a second message requesting access to the channel by the first user, the second message identifying a third number of data packets to be transmitted over the system, the third number including at least the difference between the first number and the second number.

9. A method of operating a satellite-based cellular communication system to provide for communication of data packets from a user, the method comprising:

assembling a first number of data packets for transmission over the system by the user;

sending a request by the user to access a channel of the system for transmission of the first number of data packets, the request including a unique request identifier comprising a random integer;

receiving at the user a response to the request, the response identifying a first number of specific time slots of at least one frame for transmission of the data packets;

transmitting the data packets in the specific time slots by the user.

10. A method of operating a data packet communication system comprising first transceivers, a second transceiver and a communication link coupling each of the first transceivers to the second transceiver, the method comprising the steps of:

a) assembling data packets at each of the first transceivers;

b) transmitting requests from each of the first transceivers to the second transceiver, each of the requests identifying the number of the data packets at the corresponding one of the first transceivers, each of the requests being uniquely identified by a unique request identifier comprising a random integer;

c) allocating specific time slots of at least one frame of a channel for the transmission of at least one of the data packets from at least one of the first transceivers over the communication link;

d) transmitting the at least one of the data packets over the communication link, wherein each of the at least one of the data packets is transmitted in a corresponding one of the specific time slots; and e) repeating each of the steps a) through d) until all of the data packets have been sent over the communication link.

* * * * *